E. B. HELLER.
METHOD OF TREATING LACTEAL FLUIDS.
APPLICATION FILED JAN. 19, 1915. RENEWED JUNE 19, 1916.
1,276,910.
Patented Aug. 27, 1918.
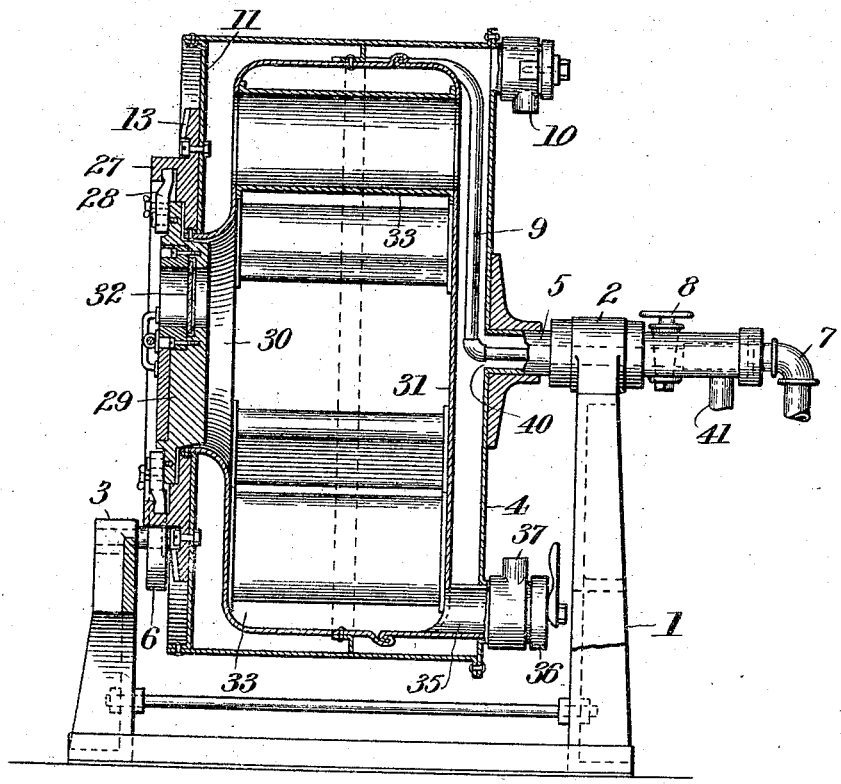
Witnesses
B. B. Collings
J. E. Casson
Inventor
Ernst B. Heller,
by J. A. Witherspoon,
Attorney

UNITED STATES PATENT OFFICE.

ERNST B. HELLER, OF NEW YORK, N. Y., ASSIGNOR, BY MESNE ASSIGNMENTS, TO THE VACUUM CHURN CORPORATION, OF NEW YORK, N. Y., A CORPORATION OF NEW YORK.

METHOD OF TREATING LACTEAL FLUIDS.

1,276,910.　　　Specification of Letters Patent.　　Patented Aug. 27, 1918.

Application filed January 19, 1915, Serial No. 3,109. Renewed June 19, 1916. Serial No. 104,572.

*To all whom it may concern:*

Be it known that I, ERNST B. HELLER, a subject of the Emperor of Germany, and residing at New York, in the county of New York and State of New York, have invented certain new and useful Improvements in Methods of Treating Lacteal Fluids; and I do hereby declare the following to be a full, clear, and exact description of the invention, such as will enable others skilled in the art to which it appertains to make and use the same.

This invention relates to a method of treating cream and other dairy products, and has for its object to provide a process which will eliminate the yeasts and molds from, as well as increase the volatile acids in, the finished butter, thereby improving the aroma and flavor as well as the keeping qualities of said butter.

To these ends the invention consists in the novel steps and combinations of steps constituting my process as well as in the new product produced by said process all as will be more fully hereinafter disclosed and particularly pointed out in the claim.

Referring to the accompanying drawing forming a part of this specification, the figure is a diagrammatic sectional view of a churn suitable for carrying out my process, although of course other mechanisms could be used.

In order that this invention may be clearly distinguished from the prior art it is said:—It is well known that the practical minimum pasteurizing temperature for milk and cream bought in the open market, is substantially 140 degrees F., for at that temperature the most resistant disease germ, such for example as the tubercle bacillus is destroyed; and that the maximum practicable pasteurizing temperature for said milk and cream is substantially 149 degrees F., because above this latter temperature the cream line that usually separates the cream from the milk is destroyed and consumers suspect the milk has been skimmed.

It is therefore likewise well known that if one wishes to carry out a practical and commercially successful pasteurizing process on a large scale using milk and cream purchased in the open market, he must employ temperatures substantially between 140 degrees F. and 149 degrees F., and he must, also maintain his temperatures for not less than 20 minutes, all as is prescribed in the laws of the various States.

It is further a matter of common knowledge in pasteurizing cream for butter making by the so called "holding process," or process in which the cream is subjected to a given temperature for a given time, that if 140 degrees F. is employed, the yeasts and molds, *Oidium lactis*, will be destroyed. But it is equally well known that not withstanding this fact, it has been heretofore found to be impossible, in large scale pasteurizing operations between the temperatures of 140 degrees F. and 149 degrees F., and employing milk and cream bought in the open market, to prevent such yeasts and molds from appearing in the finished butter.

It is further well known that the maximum degree of temperature to be actually selected when employing the holding method will in each case, depend upon the particular use to which the cream is to be put and the acidity of the cream being pasteurized. The more sour is said cream the lower will be the temperature at which a cooked flavor will appear. But, as a general rule, this cooked flavor will not be unsatisfactory until say 161 degrees F. is reached.

When pasteurizing cream for butter making by the so called "flash method," which involves only a momentary application of heat, temperatures of from 170 degrees F. to 185 degrees F. are often employed. And in the pasteurization of milk for the so called "starters" or material to be subsequently inoculated the best results are obtained by holding the milk at say from 180 degrees F. to 200 degrees F. for an hour. A common practice is to cool the pasteurized cream, then inoculate it with a "starter," and permit said cream to ripen to the desired point.

It is likewise well recognized in the art that while the foregoing fundamental facts are familiar to experts who are in the forefront of knowledge in this art, and that the above results can be attained under suitable laboratory conditions employing milk and cream of a constant quality, as from a well known and supervised source, yet, it is equally well recognized by said experts that as soon as one enters the field of large scale operations, and employs milk and cream of widely differing qualities, such as must be done when it is bought in the open market, then it is not possible to attain the results now to be disclosed.

Stated in other words, prior to my invention no means have been known of unerringly and constantly increasing on large scales the desirable flavor or aromas of cream and butter derived from open market products. Nor has any means been known of removing the undesirable odors that are constantly evolved from said products, without incurring at least a grave danger of producing an injurious effect on the cream and butter, as for example, such as the oxidation of their contained fats and thereby imparting a tallowy or greasy flavor to said products.

I have discovered, in fact, that I may work on a large commercial scale, using cream and milk of different qualities, such as is usually bought in the open market, and if I employ a vacuum during one or more of the above mentioned operations, the following surprising results will follow:—

(a) The objectionable odors will be withdrawn from the cream or butter without the objectionable injuries of oxidation which would follow if air is blown up through said cream or butter as is now sometimes done.

(b) The desirable characteristic odor or aroma of butter will be increased and its flavor greatly improved.

(c) A butter can be produced on a large commercial scale from milk and cream bought in the open market and therefore having different qualities, which butter will be free from yeasts and molds, and will also be free from tallowy or greasy flavors, which is not the case when air blasts or wooden churns are used, as has been heretofore customary.

(d) That neither cream nor butter will adhere to any substantial extent to a metal surface when cooled to the churning temperature of say from 45 degrees F. to 62 degrees F., and therefore the said metal surface may be readily and effectually so cleaned as to absolutely avoid re-inoculation of the said cream and butter during subsequent churnings. The result is that the butter and cream in subsequent operations will be just as free from objectionable germs as it was in the first operation, and therefore a uniform product can be produced on large commercial scales, a result which has not heretofore been attained. I have further found that non-adhesive surfaces of the character of porcelain, metals, vitreous surfaces, lacquered surfaces, etc., have the same non-adhesive properties for cream and butter, when sufficiently cooled.

In order that my exact process may be the more clearly understood, I will now briefly describe the churn illustrated in the accompanying drawing which is suitable for carrying out the process and will then point out with more particularity just how the above surprising results are attained.

Referring to said drawings:—1 indicates any suitable framework provided with the bearings 2 and 3; 4 an outer casing supported on the hollow shaft 5 passing through the bearings 2, and also supported by the rollers 6 carried by the bearings 3. The hollow shaft 5 is connected with a steam-supply 7, controlled by a valve 8 and adapted to deliver steam into the casing or chamber 4 by means of the pipe 9. The said casing or chamber 4 is also provided with the connection 10, by means of which it may be pumped free of air or other gas. The said chamber 4 is further provided with an inwardly extending head 11 to which is fitted a casting provided with the circular gear 13, by which said casing may be rotated by any suitable means, not shown.

Rigid with the casting 12 is the annular member 27 adapted to receive the latches 28 carried by the cover 29 closing the opening 30 into the interior chamber or churn 31. The said cover 29 is provided with a side opening 32, as shown. The interior chamber or churn 31 is provided with a plurality of hollow dashers 33 extending through the walls of said chamber 31 as shown. These dashers leave a space all around for the passage of the milk and thereby afford a chance for a maximum amount of milk to contact with their outer walls. The ends of these dashers 33 are also open to the chamber 4 as shown so that steam or hot water is afforded a free passage therethrough at all times and consequently if the said chamber 4 is kept at a given temperature, the surfaces of these dashers and therefore the contacting milk will be subjected to a constant temperature. This is an important feature of my invention, for in the making of high grade butters under vacuum processes it is of the greatest importance to know to just how high a temperature the cream is being subjected, and to also know for a certainty that this temperature in the cream has actually been reached. In addition to the above, my hollow dashers afford a greater surface in contact with the cream, and the efficiency of the churn is greatly increased.

Leading from the inner chamber 31 is a passage 35 provided with a cover 36 and a nipple 37 adapted to connect with an air pump, for the purpose of exhausting the air from said chamber 31.

Accordingly, I place cream in the inner chamber 31, exhaust the air through the connection 37, and then admit steam through the supply 7 to the outer chamber until the proper temperature has been reached to thoroughly pasteurize the cream in the chamber 31 and yet at the same time avoid heating the cream so high as to destroy its flavor. When the proper temperature has been reached as may be indicated on a thermometer, I then rotate both the inner and outer chambers on the bearings 2 and 3 until the cream is thoroughly churned. The side opening 32 enables the operator to watch the operation and to stop it when the butter has been made.

During the entire operation, no air is admitted to the cream or butter, and since it was thoroughly pasteurized after having been placed in the chamber 31 and securely sealed by the cover 29, the butter is produced with its natural flavor, and with no yeasts and molds therein. Accordingly, it will keep for a very much longer time than will butter which has been exposed to the air after it has been made.

The passage 40 around the pipe 9 serves to permit the escape of the steam or hot water in the chamber 4, and the same may be drained off through the pipe 41.

It will now be clear from the foregoing disclosure that by subjecting cream or milk to a vacuum in chamber 31, I take advantage of the fact that the gases constituting the objectionable odors, are more volatile under a vacuum than under normal pressure, and therefore I readily remove these odors without having to blow air through said milk and cream. I thereby avoid oxidizing to a greater or less extent their contained fats and consequently avoid the production of the well known tallowy and greasy tastes that accompanies the present practice of removing these odors by air streams.

It will further be understood that I have discovered the fact that when butter is subjected to a vacuum as above disclosed, its volatile fats are apparently split so that its volatile acid number is increased, therefore the butter has a much higher flavor or aroma, than that which has not received this vacuum treatment.

That is to say: Upon making actual tests of various samples to determine the quantity of volatile acids present I found that in every instance the actual volatile acids present from my vacuum process, were very much higher than those from the old process not employing a vacuum. For example certain runs were made and a given quantity of butter was taken and I found the following units of volatile acids present in the vacuum process:—

28.90
31.43
29.95
30.14
28.38
28.37

By making precisely the same tests from precisely the same quantities of butter produced under the regular method I found the following units of volatile acids present:

26.88
28.57
28.04
29.55
25.78
25.45 thus showing that in every instance there was present substantially from one to two units of volatile acids more in my butter than was normally found in butter made in the regular way.

It will also be now clear from the foregoing disclosure that I am enabled to unerringly produce on a large commercial scale at all times from creams bought in the open market and therefore having differing qualities, a uniformly high grade butter absolutely free from yeasts and molds. The reason for this is as follows:—The pasteurization of the material in the chamber 31 destroys the yeasts and molds, and the churn being of the construction disclosed can be so much more effectually cleaned or sterilized than has been heretofore possible, each new batch of material enters with certainty a germ free chamber and is therefore not accidentally re-inoculated as has been the case heretofore.

That is to say prior to my invention it has been customary to use a plurality of containers, generally four, to carry out the butter producing operation, and the transfer of the material from one container to the other was invariably accompanied in large scale operations by a re-inoculation of said material before the finished butter was had. This accidental re-inoculation often occurred on account of the material coming in contact with porous or wood surfaces, during one or more of the operations, in the pores of which all the germs could not be destroyed, and which pores therefore constituted places of infection for succeeding batches of material. When metallic vessels were employed, they have invariably contained packings, glands, joints or other features which could not be thoroughly sterilized and therefore they likewise afforded breeding places for germs from which accidental re-inoculations took place.

By using an apparatus such as that disclosed in the drawings, however, every portion of which may be heated to the very highest sterilizing temperatures, and which therefore affords no breeding places whatever for germs, each batch of fresh material is protected from accidental inoculation, and therefore the butter is of a uniform quality and free from yeasts and molds no matter how large the quantity produced.

It will again be clear from the foregoing disclosure that the problem of keeping the churn and pasteurizer absolutely sweet and clean and free from germs is greatly aided by my discovery that in pasteurizing cream in a vacuum such as above disclosed, it does not cook onto, or adhere to, or cake up, the inside metal surface of the chamber 31, as it does when the same heating process is carried out in the presence of air under atmospheric pressure.

This problem is further aided by another discovery:—that upon cooling to the churning temperature of from say 45 degrees F. to 62 degrees F. the inside non-porous surface of chamber 31 while employing a vacuum, neither the cream nor butter will adhere to said inside surface to any substantial extent, so it is easy to thoroughly cleanse the same.

In other words, it will now be clear that I pasteurize my cream in a metal chamber; I ripen it in the same chamber; and I churn it in the same chamber; all under a vacuum and without withdrawing the material from the chamber. That the churn and pasteurizer is so constructed that no germ breeding places are possible after sterilization, and that therefore no accidental, reinoculation can occur when subsequent operations are carried on. And that the vacuum or metal surface, or both, prevent the cream and butter from sticking to said chamber during the processes of pasteurizing and churning. Another advantage of the vacuum chamber 31 resides in the fact, that no foam is produced, and therefore the germs are not protected thereby, and are more easily destroyed. By pasteurizing, cooling, and ripening in the same chamber, one can operate at a temperature at least 3 degrees higher, and therefore cool to a temperature at least 3 degrees higher, because the material is not heated up as when employing different containers for the above processes.

As a result of the foregoing I produce a butter of uniform quality on large scale operations, from milk and cream bought in open markets, that has a cleaner and better flavor, a higher aroma, than has been heretofore possible, as well as a butter that is free from odors and from yeasts and molds and will therefore keep longer. In fact, I have found butter made by this process to keep in cold storage for 12 months, a result that has never heretofore been attained by butter made on large scale operations.

I have found vacuums from 16 to 26 inches of mercury very efficient, but of course, other degrees of exhaustion may be employed if desired.

It is obvious that those skilled in the art may vary the details of my process without departing from the spirit of the invention, and therefore I do not wish to be limited to the above disclosure except as may be required by the claim.

What I claim is:—

The process of manufacturing butter and preventing its globules from sticking on the interior of the container which consists in carrying out the pasteurizing, churning and working operations in a rotating, partially exhausted vessel having smooth, non-porous, non-absorbent walls; and artificially cooling said walls to a temperature below 62° F. to prevent the formed butter from adhering thereto to an objectionable degree, substantially as described.

In testimony whereof I affix my signature in presence of two witnesses.

ERNST B. HELLER.

Witnesses:
CUSHING ADAMS,
CARRIE M. BRENNAN.

Copies of this patent may be obtained for five cents each, by addressing the "Commissioner of Patents, Washington, D. C."